Jan. 7, 1941. A. C. DE HOFFMANN 2,228,203
COMBINATION AUTOMOBILE RACK AND CAMPING OUTFIT
Filed March 15, 1938 6 Sheets-Sheet 1
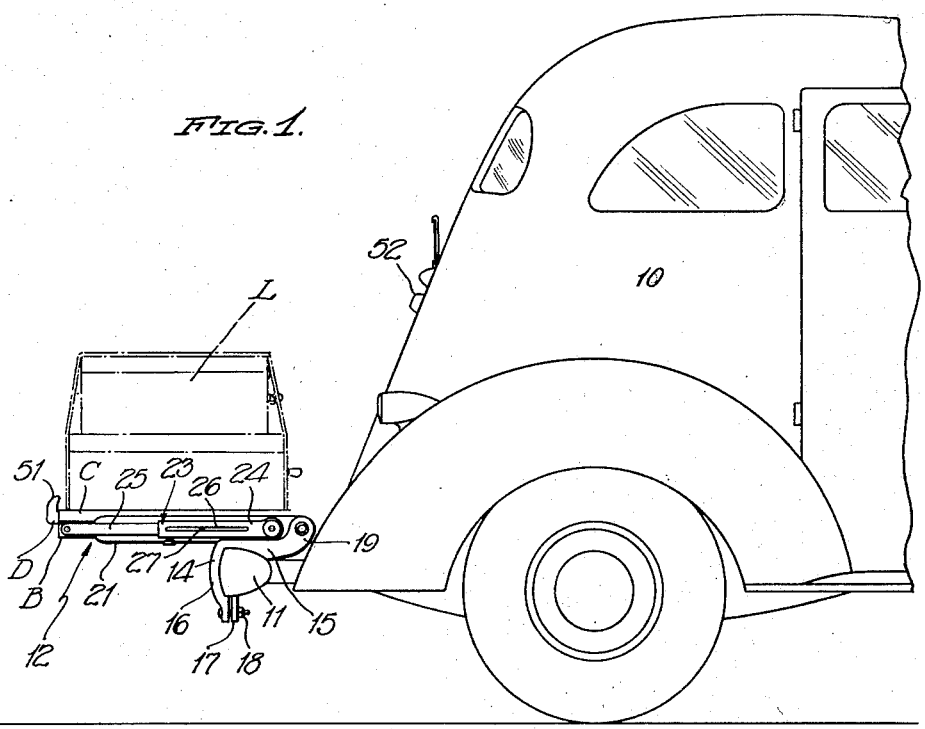
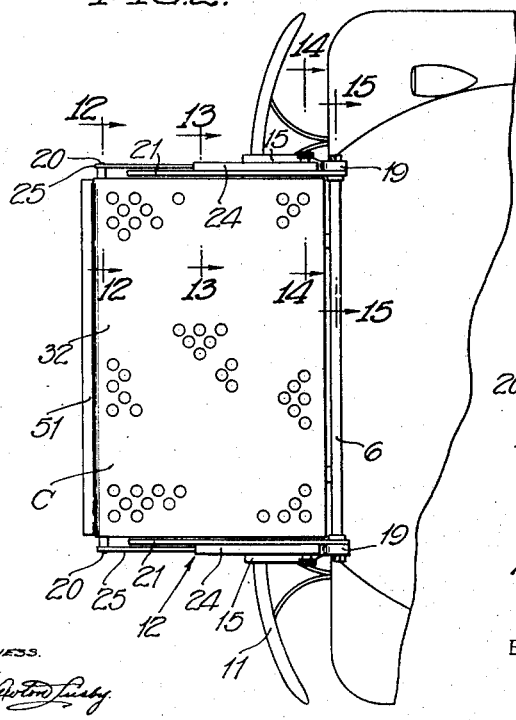
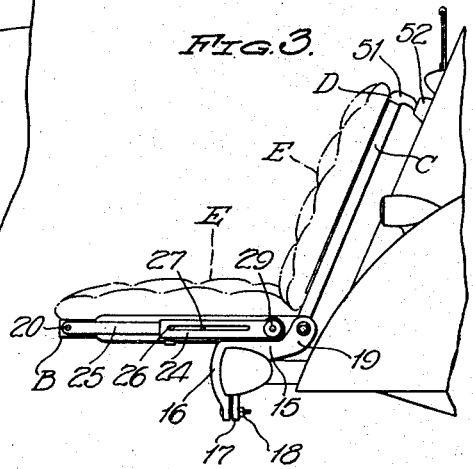
Alexander C. de Hoffmann.
INVENTOR.
BY Ely & Pattison
ATTORNEYS.

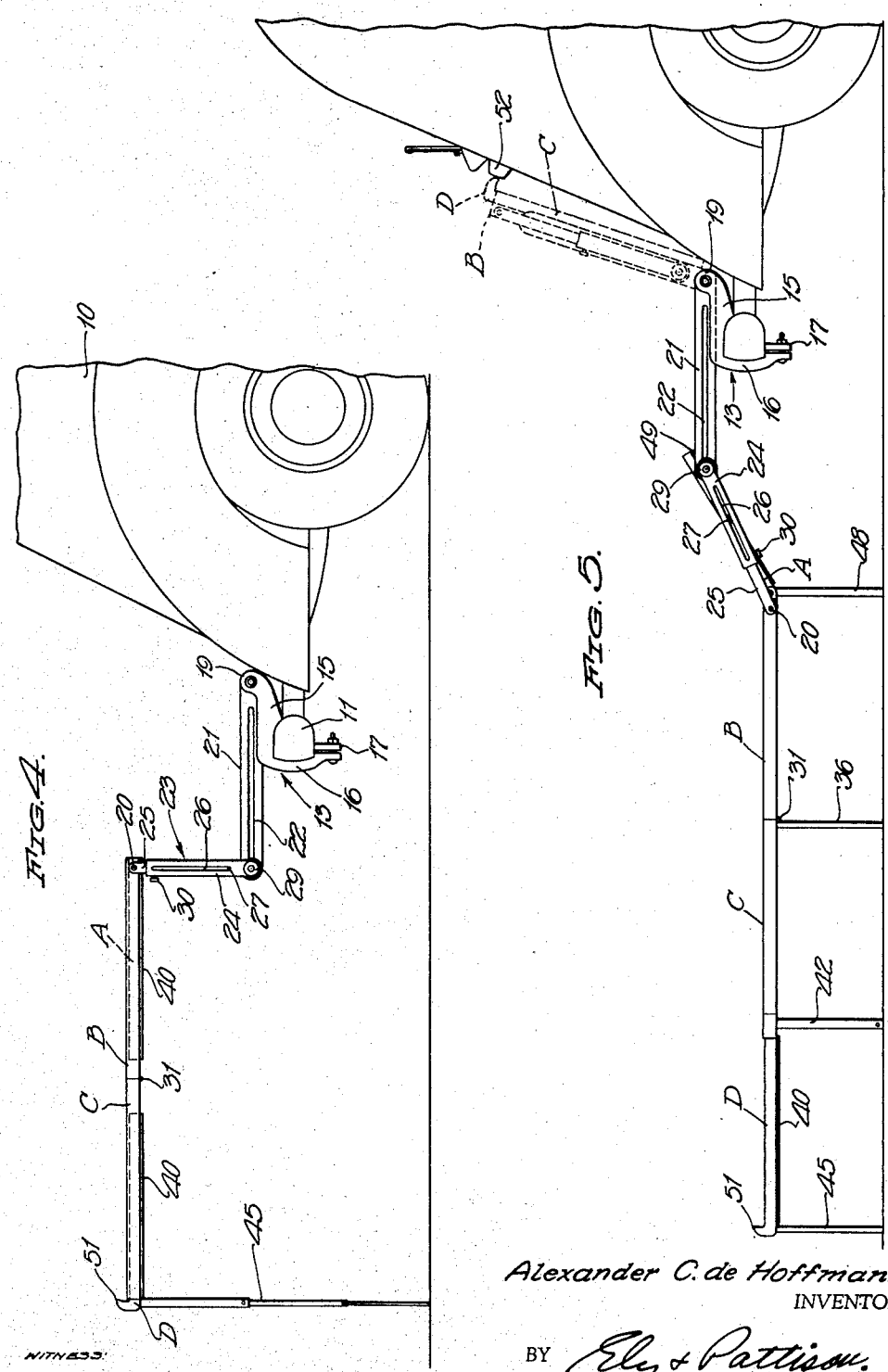

Jan. 7, 1941.     A. C. DE HOFFMANN     2,228,203
COMBINATION AUTOMOBILE RACK AND CAMPING OUTFIT
Filed March 15, 1938     6 Sheets-Sheet 3
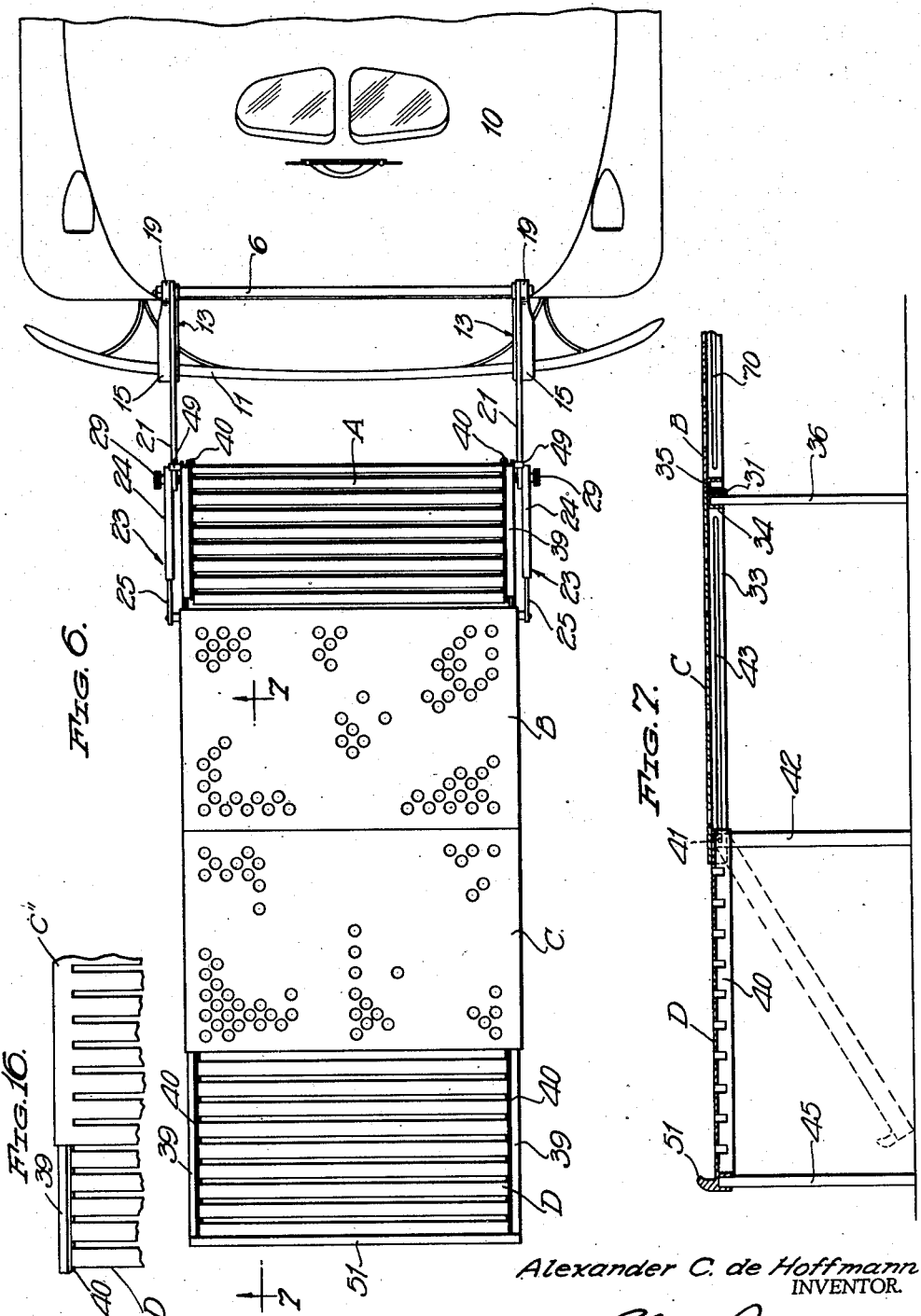
Alexander C. de Hoffmann.
INVENTOR.
BY Ely & Pattison.
ATTORNEYS.

Jan. 7, 1941.  A. C. DE HOFFMANN  2,228,203
COMBINATION AUTOMOBILE RACK AND CAMPING OUTFIT
Filed March 15, 1938  6 Sheets-Sheet 4
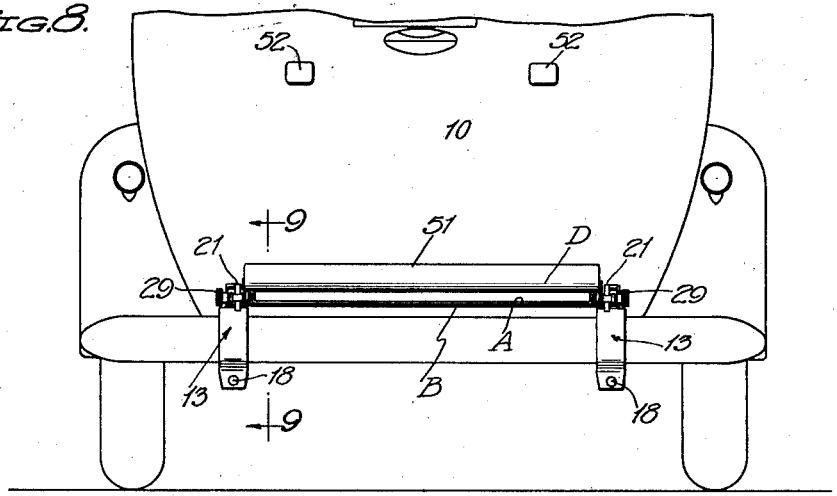
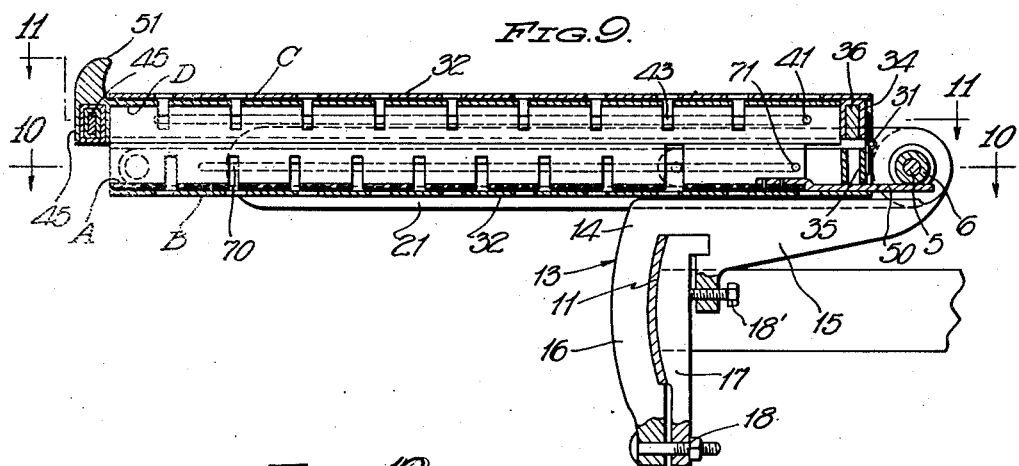
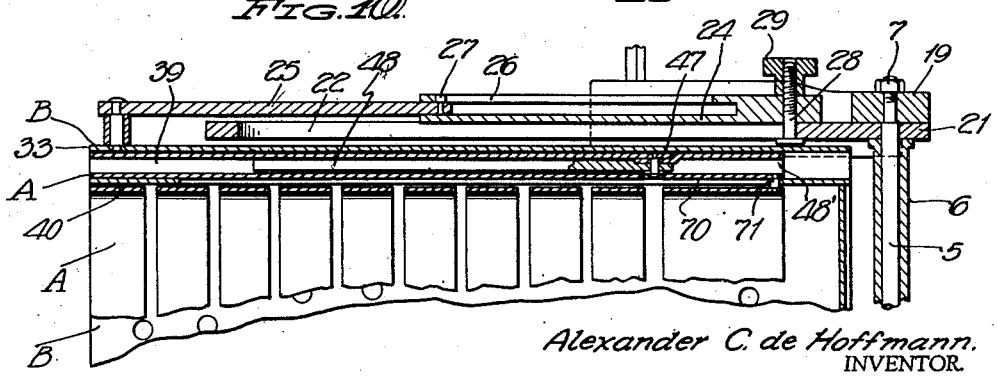
Alexander C. de Hoffmann,
INVENTOR.
BY Ely & Pattison
ATTORNEYS.

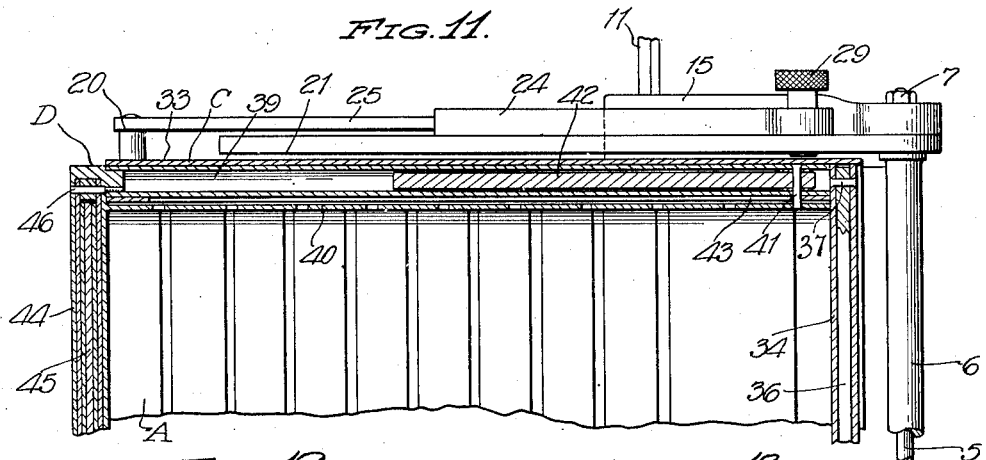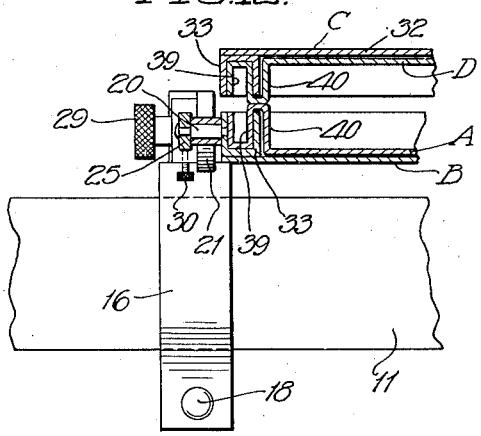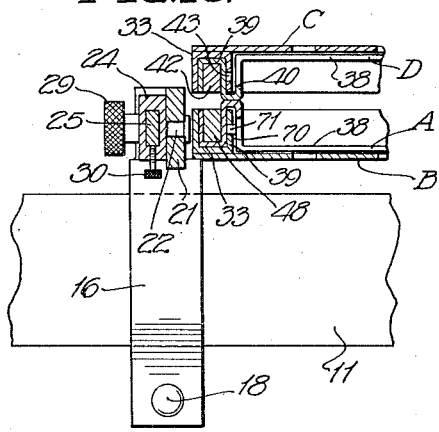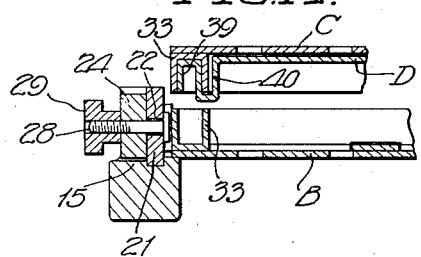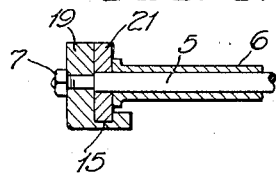

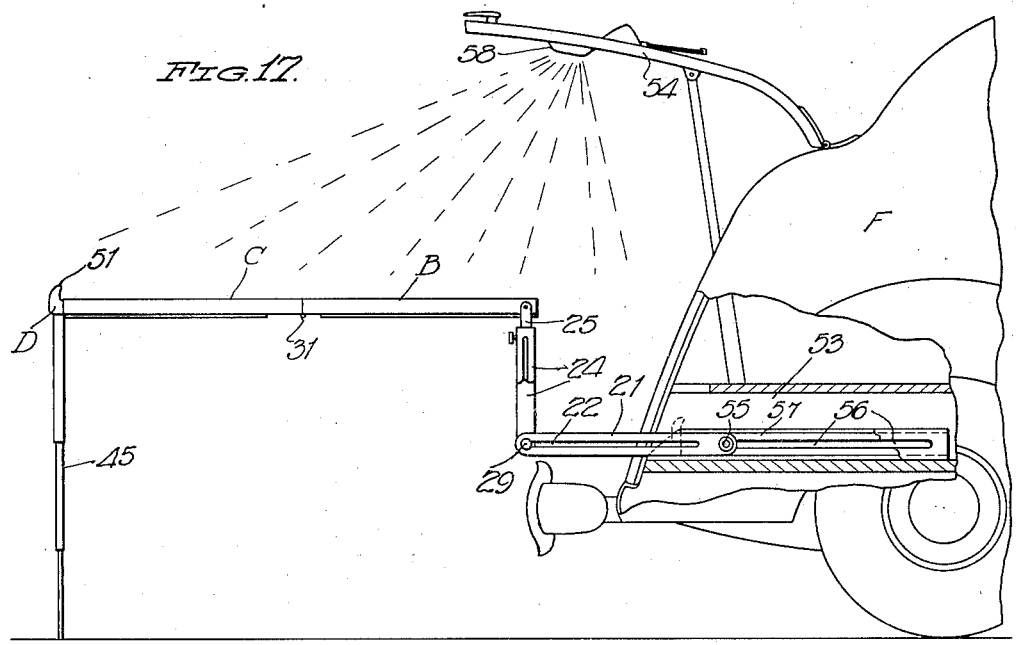
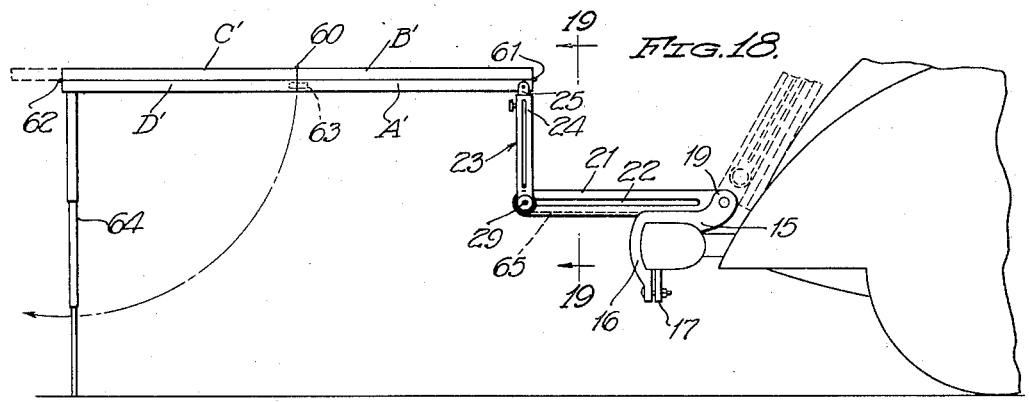
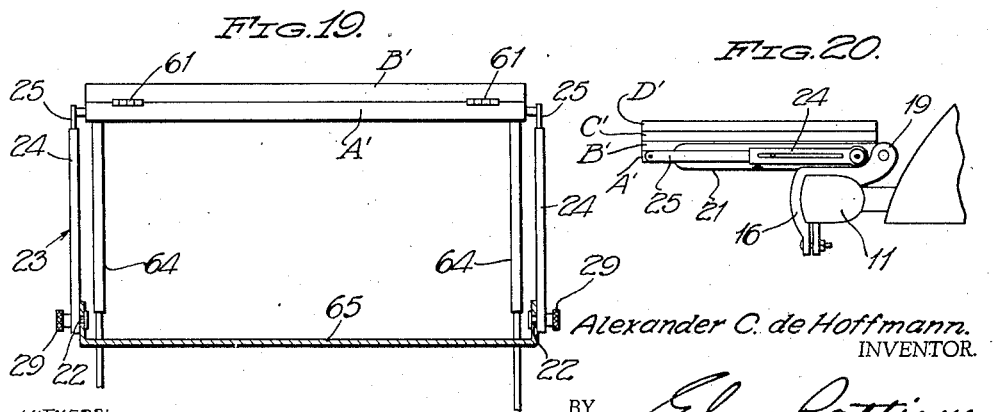

Patented Jan. 7, 1941

2,228,203

UNITED STATES PATENT OFFICE 2,228,203

COMBINATION AUTOMOBILE RACK AND CAMPING OUTFIT

Alexander C. de Hoffmann, New York, N. Y.

Application March 15, 1938, Serial No. 195,935

7 Claims. (Cl. 224—29)

This invention relates to improvements in automobile racks and more specifically to a collapsible structure which when in normally folded position constitutes a rack or luggage carrier, and which may be extended to form either a bed, a chaise longue, a small table, or a large extension table.

The main object of the invention resides in a collapsible structure which may be carried at the rear of a motor vehicle and set up for the convenience of picknickers or auto-tourists when making overnight stops along the road, and which structure may be transformed into various articles of camping equipment to suit the comfort of the users.

Another feature of the invention is to provide an automobilist's collapsible camping outfit which is light in weight, easy to set up for use as a bed, chaise longue, small table, large table, or bench, and foldable into a compact manner to provide a luggage rack without departing from the appearance of the automobile on which it is carried.

With these and other objects in view, the invention resides in the certain novel construction, combination and arrangement of parts, the essential features of which are hereinafter fully described in the specification, are particularly pointed out in the appended claims, and are illustrated in the accompanying drawings, in which:

Figure 1 is a fragmentary side elevational view of an automobile illustrating my collapsible camping outfit in use as a luggage carrier.

Figure 2 is a top plan view.

Figure 3 is a side elevational view showing the device set up for use as a bench.

Figure 4 is a side elevational view of the device set up for use as a table.

Figure 5 is a side elevational view of the device set up for use as a bed, the dotted lines indicating the device in collapsed position against the rear of the automobile body.

Figure 6 is a top plan view of the device as set up in Figure 5.

Figure 7 is an enlarged vertical sectional view on the line 7—7 of Figure 6.

Figure 8 is a rear elevational view illustrating the device in collapsed position as a luggage carrier as shown in Figure 1.

Figure 9 is an enlarged vertical longitudinal sectional view on the line 9—9 of Figure 8.

Figure 10 is a fragmentary horizontal sectional view on the line 10—10 of Figure 9.

Figure 11 is a fragmentary horizontal sectional view on the line 11—11 of Figure 9.

Figure 12 is a detail vertical sectional view on the line 12—12 of Figure 2.

Figure 13 is a detail vertical sectional view on the line 13—13 of Figure 2.

Figure 14 is a detail vertical sectional view on the line 14—14 of Figure 2.

Figure 15 is a detail vertical sectional view on the line 15—15 of Figure 2.

Figure 16 is a detail fragmentary top plan view illustrating a modified form of the folding sections.

Figure 17 is a sectional side elevational view illustrating the device set up for use as a table and associated with an automobile having a rear compartment for folding thereinto.

Figure 18 is a side elevational view of a modified form of the device set up for use as a table, the dotted lines indicating the position of the parts when in folded non-use position.

Figure 19 is a vertical sectional view on the line 19—19 of Figure 18.

Figure 20 is a side elevational view of the device shown in Figure 18, collapsed for use as a rack or luggage carrier.

Like reference characters refer to similar parts throughout the several views of the drawings.

Referring to the drawings by reference characters and at present to the form of the invention shown in Figures 1 to 15 inclusive the numeral 10 designates a motor vehicle of the passenger sedan type having a rear bumper bar 11 to which my combination rack an automobilist's collapsible camping outfit shown in its entirety at 12 is attached.

The collapsible camping outfit 12 includes a pair of spaced attaching brackets 13—13 arranged in spaced relation upon the bumper bar 11. Each of the brackets 13 includes an angular member 14 having a horizontal seat portion 15 and a downwardly extending jaw portion 16 which engages the rear side of the bumper bar 11 and coacts with an interfitting clamping plate 17 to secure the member 14 in position. Bolts 18 pass through the lower ends of the jaw portion 16 and plate 17 and together with the clamping screw 18' (Figure 9) serve to clamp the bracket in firm position upon the bumper bar 11. The forward end of the seat portion 15 is formed with an upstanding ear 19. Passing through the transversely alined ears 19 of the brackets 13—13 is a tie rod 5 (Figures 9 to 11) on which a spacer sleeve 6 is mounted and the ends of which sleeve abut the inner sides of links 21. The links 21 are pivoted adjacent opposite ends of the tie rod and nuts 7 threaded to the outer ends of the tie rod hold these parts in assembled relation.

The pair of pivoted links 21 normally extend rearwardly beyond the rest upon the horizontal seat portions 15 of the brackets 13. The links 21 are provided with elongated slots 22 and pivotally connected to the links 21 are extensible links 23, each of which includes a tubular link section 24 in which a link section 25 is slidably and telescopically arranged. Each link section 24 is provided in its outer wall with an elongated slot 26 in which a pin 27 extending from the link section 24 extends for limiting the relative sliding movement of the link sections 24 and 25. A bolt 28 (Figure 14) passes through the slot 22 of each link 21 and through one end of its associated extensible link 23 and threaded to the outer end of the bolt is a thumb nut 29 which when tightened acts to clamp the links 23 and 21 in relative angular positions. A set screw 30 (Figure 13) is threaded into the tubular link section 24 for clamping engagement with the link section 25 for securing the link sections in various extended positions relative to each other.

Captively connected to the outer ends of the link sections 25 is a collapsible foldable structure including four flat camp furniture forming sections A, B, C, and D of substantially equal dimensions. The ends of the sections 25 of the extensible links 23 are pivotally connected to opposite sides of the section B as at 20. The sections A, B, C, and D, may be made of light rigid metal to facilitate the easy folding and unfolding of the same in a manner and for the purposes hereinafter fully described.

The sections B and C are hingedly connected at 31 and when the sections are in extended position as shown in Figures 4 and 5, the hinge joint breaks upwardly so that the section C folds beneath the section B. The sections B and C are substantially of identical construction for the sections A and D respectively slide thereinto when the sections are folded to collapsed rack forming position, and when the sections are set up to form a small table.

Each section B and C include a flat perforated wall 32 (Figure 12) having depending side channels 33. The hinged end of the section C is provided with a transverse channel 34 (Figure 9) while the hinged end of the section B is provided with a transverse channel 35 and it is to these transverse channels that the hinge connection 31 is attached. The transverse channel 34 has legs 36—36 pivoted at 37 (Figure 11) adjacent opposite ends thereof which fold into the channel 34 when the structure is collapsed and which may be swung to an upstanding position when the sections are extended for supporting the section C adjacent its hinge connection 31.

The sections A and D are of substantially the same construction in that each includes a flat slotted wall 38 (Figure 13) and inversely disposed slide channels 39 and 40 secured to or integral with one side of the wall 38. The outer channels 39 of the section D are slidable within the channels 33 of the section C when the sections are in collapsed position, and likewise the channels 39 of the section A are slidable in the channels 33 of section B (Figures 11 to 14). The inner channels 40 of the sections A and D respectively receive the inner walls of the channels 33 of the sections B and C as best illustrated in Figures 12 and 13 of the drawings.

Pivoted within the outer channels 39 of the section D adjacent the inner ends thereof as at 41 (Figure 11) are pivoted legs 42, the pivot pins 41 passing through slots 43 in the inner walls of the channels 33 of the section C for guiding and limiting the sliding movement of the sections D and C relative to each other.

The outer end of the section D is provided with a transverse channel rail 44 in which extensible legs 45 are pivotally mounted as at 46 (Figure 11). The legs 45 when collapsed fold into the transverse channel rail 44 and may be swung to vertical position when the section D is extended to support the same in its table forming position as shown in Figure 4 or in its bed forming position as shown in Figure 5. Each leg 45 includes a plurality of telescoping sections of conventional construction having releasable means for securing the sections in various positions of adjustment.

The section A is provided with a pivoted break joint 47 (Figure 10) to provide a portion 48' which remains in lapped engagement with the section B when the sections A and B are in extended position as shown in Figure 5. Pivoted at the break joint 47 within the channels 39 of the section A are legs 48 which support one end of the section B when the same is in extended position and the outfit set up as a bed or chaise longue as shown in Figure 5.

The section A is slidably connected to the section B by providing elongated slots 70 in the inner flanges of the channels 33. Pins 71 bridge the walls of the inner channels 40 of the section A and pass through the respective slots 70. The ends of the slots 70 limit the sliding movement of the pins 71 and consequently limit the inward and sliding movement of the section A relative to the section B.

The free end of the section A when the outfit is set up as a bed or chaise longue is supported in an inclined position by lugs 49 which extend from opposite sides of the section A and rest upon the links 21.

The section A is provided with a tail piece 50 at that end which is disposed adjacent the hinge joint 31 when the sections A and B are collapsed as shown in Figure 9, to underlie the sleeve 6 on the tie rod 5 to provide a luggage rack. The tail piece 50 coacts with the seat portions of the brackets 14 to rigidly support the load of the folded sections and that of the luggage L supported thereon as illustrated in dot and dash lines in Figure 1 of the drawings.

The outer end of the section D is provided with an upstanding flange 51 which acts as a stop for limiting the rearward shifting movement of the luggage L when the outfit is folded and in use as a luggage rack.

In Figures 1 and 2 of the drawings I have illustrated the outfit folded into a position for use as a luggage rack, the sections A and D being disposed within the respective sections B and C, and the section D being superposed relative to the section B. The links 21 and 23 are in horizontal parallel relation with the folded sections and the pivot bolts 28 are at the inner ends of the slots 22 with the nuts 29 tightened (Figure 10). Thus the collapsed structure provides a luggage rack; but, should it not be desired to use the collapsed structure as a luggage rack, the same may be swung upward on the pivot tie rod 5 to a position against the rear of the body of the motor vehicle 10 as shown in dotted lines in Figure 5. Any suitable catch means may be provided for holding the collapsed structure in this raised position.

When it is desired to use the collapsed structure as a bench as shown in Figure 3, the section C within which the section D is housed is swung upwardly on the hinge joint 31 from the horizontal position shown in Figure 1 and the flange 51 rests against a stop 52 projecting from the rear of the body of the motor vehicle 10. The section C constitutes a back whereas the horizontal section B serves as a seat. If desired, cushions E may be placed upon the seat section B and against the rearwardly inclined upstanding section C for the comfort of a user.

Should it be desired to extend the sections from their collapsed position shown in Figure 1 to a small table as shown in Figure 4, the thumb nuts 29 are loosened and the folded sections pulled outward together with the links 21 until the bolts 28 engage the outer ends of the slots 22 at which time the nuts 29 are made tight with the links 23 extending upright. The sections B and C are then swung upon the hinge connection 31 to assume a position in co-extensive relation and said sections constitute the table top. The telescoping extensible legs 45 are swung down to vertical position, after which the extensible link 23 is adjusted to its proper height to level off the sections B and C.

Should it be desired to convert the collapsible structure into a bed or chaise longue as shown in Figures 5 and 7 of the drawings, the sections B and C are unfolded from the position shown in Figure 1 in the same manner as described in the formation of a table, but after they are swung to extended position, the sections A and D are pulled outward to their extended position and the legs 45, 42, 36, and 48 swung down to vertical position. The extensible legs 45 are adjusted to the height of the other legs and support the sections B, C, and D on an even substantially horizontal plane. The extensible links 23 are adjusted to extend downwardly at an angle, while the section A has its free end supported upon the links 21 in an inclined position to form a head rest. It will be understood that a mattress will be placed upon the extended sections for the comfort of a user. Also, whereas the tops of the sections B and C have been shown and described as having openings therein, these sections may be made in slat form as shown in Figure 16 at C″ to lend more resiliency to the bed structure.

If desired, the outer end section D may be lowered to an inclined position as shown in dotted lines in Figure 7 to form a leg rest or permit use of the structure as a chaise longue. When the section D is in this position, the legs 45 are folded into the channel 44.

In Figure 17 of the drawings, I have illustrated my collapsible camping outfit attached to an automobile F of the type having a rear storage compartment 53 normally closed by a swinging door 54. In this style of vehicle, the attaching means is different than that heretofore described, for instead of pivotally connecting the links 21 to a cross rod which is mounted in attaching brackets, I connect them by a cross rod 55 and extend the ends of the cross rod into slots 56 provided in spaced fixed rails 57 which extend fore and aft within the compartment 53. When the sections A, B, C, and D, are collapsed as indicated in Figure 1, the same may be slid into the compartment 53 and concealed when the door is in closed position. The inner side of the door 54 is provided with an electric light 58 which when the sections are extended for use as a table as shown in Figure 17 may be used at night for illumination while eating, reading, or playing cards.

In Figures 18 to 20 inclusive, I have shown a slightly modified form in the connection of the collapsible sections. The sections in this form are designated A′, B′, C′, and D′. The sections B′ and C′ are connected by a hinge joint 60 which enables the swinging of one of these sections over the other and which breaks in the reverse manner to the hinge connection 31. The sections A′ and D′ are hinged to the sections B′ and C′ as at 61 and 62 respectively whereby the sections A′ and D′ may be swung to their bed forming position or to an extension table forming position as shown in dotted lines. Suitable releasable catch means 63 may be provided for holding the sections A′ and D′ in their folded positions. In Figures 18 and 19 the collapsible sections are shown extended for table use and extensible legs 64 carried by the section D′ support the outer end of the structure whereas the inner end is supported by the brackets 23. It will be understood that the sections are provided with sufficient foldable supporting legs (not shown) to support the sections A′, B′, C′, and D′, when in fully extended position for use as a full size table or bed.

The attaching means for the form of the invention shown in Figures 18 to 20 inclusive, is the same as that shown in Figures 1 to 15 inclusive with the exception that the links 21 are connected by a flat plate 65 which may be used as a seat for a person or persons when the structure is set up as a table as shown in Figure 18.

Figure 20 discloses the sections A′, B′, C′, and D′ in collapsed superposed relation for use as a luggage rack.

From the foregoing description read in conjunction with the accompanying drawings, it will be seen that I have provided a compact foldable structure which may be carried on the rear of an automobile for normal use as a luggage rack, and which may be unfolded and set up for use as a small table, large table, bench, bed, or chaise-longue. Such apparatus will be found attractive to auto tourists in providing the comforts of an overnight stop on the road, or by picknickers for enjoying a day's outing in the open air. The apparatus eliminates the necessity of carrying collapsible card tables, cots, chairs and other individual articles of camping furniture within the automobile or suspended on the outside thereof.

While I have shown and described what I conside to be the preferred embodiments of my invention, I wish it to be understood that such alterations in construction as come within the scope of the appended claims may be resorted to if desired.

Having thus described the invention, what I claim as new and desire to secure by Letters Patent of the United States, is:

1. A camping outfit for attachment to the rear of a motor vehicle comprising in combination, a pair of spaced slotted links, means for connecting said slotted links to the rear of a motor vehicle, a pair of extensible links, pivot pins carried by the inner ends of said extensible links and slidably disposed in the slots of the respective slotted links, a plurality of flat rigid sections of substantially uniform dimensions, one of said sections being pivotally connected to the outer ends of said extensible links, means connecting said sections together for folding movement to a collapsed position in superposed relation between said slotted links to form a luggage rack, or to an unfolded extended position beyond said slotted links and at a spaced distance from the rear of the motor vehicle to form an article of camp furniture, and legs pivoted to said sections for supporting the same in elevated position when extended.

2. Camping equipment of the character described including a pair of flat hingedly connected sections foldable to an extended position on substantially the same horizontal plane to form a table or to a collapsed position one upon the other to form a luggage rack, a horizontal support for said sections disposed beyond one end thereof when the sections are in extended position and on which said sections rest when they are in collapsed position, a pair of links pivotally connected to the outer end of one of said sections and adapted to act as short legs to support the said one of said sections upon said support when the same are in extended table forming position, pin and slot connections between said links and said support to enable inward and outward sliding of said links during the extended and collapsing movement of said sections, legs carried by the other of said sections for supporting the same when in extended position, and means for attaching said support to the rear bumper bar of a motor vehicle.

3. Camping equipment of the character described including a pair of hingedly connected table sections foldable to a rack forming position in superposed relation and unfoldable to lie on the same horizontal plane to table forming position, attaching means for connecting the outer end of one of said sections to the rear of an automobile and for assisting in supporting the same when said sections are unfolded to table forming position, said attaching means including brackets, a pair of parallel horizontally disposed arms having one of their ends connected to said brackets, slots provided in said arms, a pair of links having their outer ends pivoted to the outer end of one of said sections, pins carried by the inner end of said pair of links which are slidably disposed in the slots of the respective arms, and foldable legs carried by the other of said sections for coaction with said attaching means for supporting said sections in an elevated extended table forming position.

4. A foldable camping outfit for attachment to the rear of a motor vehicle comprising in combination a pair of flat hingedly connected bed or table forming sections swingable to a folded position one against the other, each of said sections having side channel rails, a pair of flat slidable bed forming sections, each slidable section having side channel rails, the side channel rails of the slide sections being disposed in the side channel rails of the respective hinged sections whereby said slide sections may be slid to an extended position beyond the outer ends of the respective hinged sections to form a bed or to a retarded position therebeneath when the hinged sections are in table forming position, stop means for limiting the sliding movement of the sliding sections in opposite sliding directions, pivoted leg members carried by the hinged sections and sliding sections and foldable to a collapsed position thereagainst, and unfoldable to an upstanding supporting position, and attaching means to which one of the hinged sections is connected by which the camping outfit may be captively connected to the rear of a motor vehicle and the sections supported thereon in a folded collapsed position one upon the other.

5. A foldable camping outfit for attachment to the rear of a motor vehicle comprising in combination a pair of spaced horizontally disposed supporting arms having slots extending lengthwise thereof, a pair of extensible links, each of said extensible links including a pair of slidably connected link sections, means for securing said link sections in an adjusted position against sliding movement, a pivot pin carried by the outer end of one of the link sections of each extensible link, the pivot pins of the pair of links being slidably disposed in the respective slots of the pair of arms, clamping nuts threaded to the outer ends of said pivot pins for fixedly securing the extensible links against sliding movement relative to the pair of arms, a combined folding bed composed of a plurality of foldable sections which may be unfolded and set up for use or folded to a position one upon the other, and pivotal connections between one of said foldable sections and the outer ends of the other link sections of said extensible links.

6. A foldable camping outfit as set forth in claim 5, including a pair of clamp brackets adapted to be secured to the rear bumper bar of a motor vehicle, each of said brackets having a horizontal seat, the pair of arms having their inner ends pivotally connected to the clamp brackets and normally resting upon the horizontal seats.

7. In combination with an automobile having a body provided with a compartment in the rear thereof, a pair of spaced rails fixedly mounted in said compartment, said rails having longitudinal slots therein, a collapsible structure including a plurality of flat sections foldably connected together for collapsing one upon the other or to an extended position beyond said body to various angular positions to form a variety of articles of camping furniture, links having their outer ends pivotally connected to one of said sections, a pair of spaced parallel arms slidable along the rails, a cross rod connecting the inner ends of said arms and having its ends extending into said longitudinal slots to facilitate back and forth sliding movement of said arms relative to said rails, pin and slot connections between the inner ends of said pair of links and said pair of arms, whereby the collapsed sections may be slid in and out of said compartments as a unit, and foldable legs on said sections for assisting in supporting the same in furniture forming position when said sections are extended to such position.

ALEXANDER C. DE HOFFMANN.